May 8, 1962 M. S. CARMICHAEL, JR., ETAL 3,033,584
LEVELING DEVICE FOR MOBILE VINER

Filed Nov. 15, 1960 6 Sheets-Sheet 1

INVENTORS
MEAD S. CARMICHAEL JR.
ROBERT A. STARK
BY
Schmieding and Fultz
ATTORNEYS

INVENTORS
MEAD S. CARMICHAEL JR.
ROBERT A. STARK

BY Schmieding and Fultz
ATTORNEYS

May 8, 1962 M. S. CARMICHAEL, JR., ETAL 3,033,584
LEVELING DEVICE FOR MOBILE VINER

Filed Nov. 15, 1960 6 Sheets-Sheet 4

INVENTORS
MEAD S. CARMICHAEL JR.
ROBERT A. STARK

BY *Schmieding and Fultz*

ATTORNEYS

FIG. 6

May 8, 1962 M. S. CARMICHAEL, JR., ETAL 3,033,584
LEVELING DEVICE FOR MOBILE VINER

Filed Nov. 15, 1960 6 Sheets-Sheet 6

INVENTORS
MEAD S. CARMICHAEL JR
ROBERT A. STARK

BY *Schmieding and Fultz*
ATTORNEYS

United States Patent Office 3,033,584
Patented May 8, 1962

3,033,584
LEVELING DEVICE FOR MOBILE VINER
Mead S. Carmichael, Jr., and Robert A. Stark, Columbus, Ohio, assignors to The Scott Viner Company, Columbus, Ohio, a corporation of Ohio
Filed Nov. 15, 1960, Ser. No. 70,101
12 Claims. (Cl. 280—6.1)

The present invention relates to an improved harvester and, more particularly to a viner for separating peas, beans, or similar products from the vines and pods.

This application is a continuation-in-part of my co-pending application Serial Number 813,567, filed May 15, 1959, now abandoned, which is a continuation-in-part of Serial Number 532,836, filed September 7, 1955, now Patent No. 2,918,292.

The present invention is particularly adaptable to viners operating on the impact principle wherein the vines are fed into the end of a rotating screen covered drum. A beater cylinder is rotated within the screen covered drum, and a series of beaters are mounted on the outer periphery of the beater cylinder. When the beaters strike the pods, such pods are opened by impact and the crop, such as peas or beans, falls downwardly through the screen covered drum to the surface of a separating apron, or inclined conveyor. The crop will then roll downwardly to a collecting means and the small particles of vines and pods will be carried upwardly by the conveyor so as to be separated from the crop.

In viners of this general type it is necessary to maintain the crop separating apparatus level since the effectiveness of the inclined crop separating apron is a function of the angle of inclination of such apron relative to the horizontal. When the viner is of the stationary type this of course presents no problem, but in the case of mobile viners which are drawn through a field, it becomes necessary to continuously maintain the viner frame, and hence the crop separating apparatus, in a level position in order to achieve efficient separation of the crop from the particles of pod and vine.

It is therefore an object of the present invention to provide a viner of the type described which includes improved leveling mechanism for continuously maintaining the frame of the machine in a level position during mobile operation of the viner.

It is another object of the present invention to provide mechanism of the type described wherein two multiple-wheel supporting units are provided for supporting a viner, with one unit on each side of the frame. Each unit is arranged to maintain its respective frame side at the proper height independently of differences in heights of the wheels of said unit, one above the other, caused by said wheels encountering uneven ground surface conditions.

It is another object of the present invention to provide a viner of the type described which includes multiple-wheel supporting units connected to the frame by leveling mechanism adapted to distribute the load equally between the respective wheels of each multiple-wheel supporting unit when such wheels encounter uneven ground surface conditions.

Further objects and advantages of the present invention will be apparent from the following description, reference being had to the accompanying drawings wherein a preferred form of embodiment of the invention is clearly shown.

Figure 1:
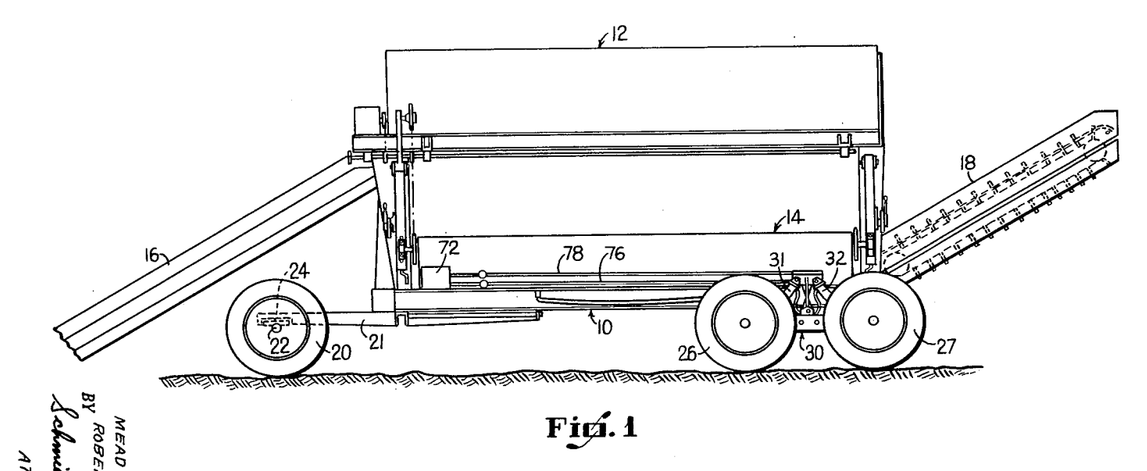
FIG. 1 is a side elevational view of a viner provided with the leveling mechanism of the present invention.

Referring to FIG. 1 of the drawing, the viner illustrated includes a frame 10 which supports crop hulling apparatus indicated generally at 12. A crop separating apparatus, formed as an inclined moving apron on which the crop and particles of hull and vine are dropped, is indicated generally at 14.

The machine also includes an inclined conveyer 16 arranged to feed vines bearing the crop into the front end of the hulling apparatus 12, and a conveyor 18 for carrying away the vines after the crop has been removed from the hulls in the hulling apparatus 12.

The front end of the viner is provided with a pair of supporting wheels one of which is seen at 20 in FIG. 1. The forward frame member 21 is connected to an axle 22 with a suitable universal joint connection 24. With such universal joint the viner frame 10 can be both pitched and rolled relative to the front supporting wheels 20.

With continued reference to FIG. 1, the rear of the viner is provided with a left pair of supporting wheels, on the left side, and a right pair. The former are seen at 26 and 27 in FIG. 1, the latter being hidden from view.

Figure 2:
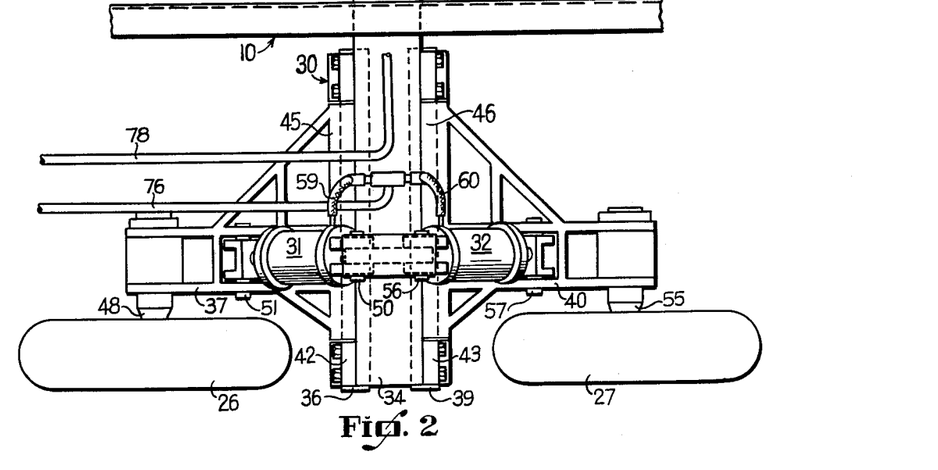
FIG. 2 is a plan view of one of the multiple-wheel supporting units of the leveling mechanism of FIG. 1.
Figure 3:
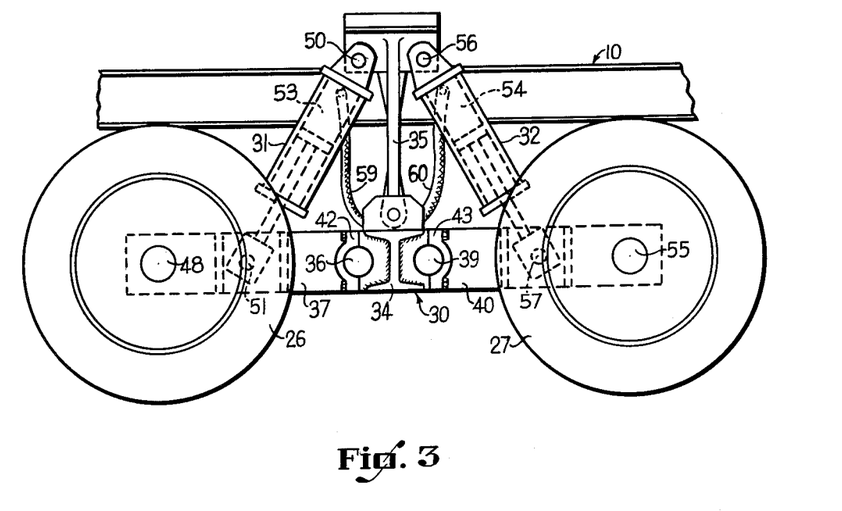
FIG. 3 is a side elevational view of the multiple-wheel supporting units of FIG. 2.

Each pair of rear wheels is provided with an extendable and retractable mounting means indicated generally at 30 in FIGS. 1, 2, and 3. FIGS. 2 and 3 are enlarged views showing one of the mounting means 30 which includes two hydraulic cylinders 31 and 32.

The mounting means 30 is formed by a heavy transverse structural member 34 joined to frame 10 by vertical members 35. Structural member 34 carries a shaft 36 which forms a pivot for movement of arm 37 in a vertical plane. Similarly, shaft 39 forms a pivot for movement of arm 40 in a vertical plane.

The ends of shaft 36 are secured to member 34 by blocks 42 and the ends of shaft 39 are secured to the other side of such member by blocks 43.

The inner ends of arms 37 and 40 are provided with bearings 45 and 46 which pivotally attach the arms to the shafts 36 and 39 respectively.

The outer end of arm 37 carries an axle 48 for wheel 26 and hydraulic cylinder 31 has its upper end pivotally attached to frame 10 at 50 and its lower end pivoted to arm 48 at 51. When pressurized fluid is introduced into upper chamber 53 of cylinder 31, the frame 10 will be raised relative to wheel 26.

In a similar manner the outer end of arm 40 carries an axle 55 for wheel 27 and hydraulic cylinder 32 has its upper end pivotally mounted on frame 10 at 56 and its lower end pivoted to arm 40 at 57. When pressurized fluid is introduced into upper chamber 54 of cylinder 32 the frame 10 is raised relative to wheel 27.

When pressurized fluid is expelled from chambers 53 and 54 the frame 10 is of course lowered relative to the wheels.

As is best seen in FIG. 2, the upper chambers 53 and 54 of the two hydraulic cylinders 31 and 32 are connected to common line 76 by the lines 59 and 60. The common line 76 leads to source of pressurized fluid indicated generally at 72 in FIG. 1. A separate line 78, FIG. 2, leads from the source of pressurized fluid 72 to a second pair of hydraulic cylinders 61 and 62 mounted on the other side of the viner frame and schematically illustrated in the circuit diagram of FIG. 4.

Due to the common connection of chambers 53 and 54, the pressures in such chambers will always be equal, and, as a result, wheel 26 will always be subjected to the same load as the wheel 27. Such equal pressure condition, and the resulting equal load distribution between the two wheels, will be maintained for all relative levels between the two wheels. When one wheel encounters a protrusion it will rise to a higher position than the other wheel but both wheels will continue to support equal portions of the total load. The same is true when a depression in the ground surface is encountered.

Reference is next made to FIGS. 5 through 10 which illustrate a pendulum assembly 106 which functions as a level sensing and switch actuating mechanism for the control apparatus of the present invention. The pendulum assembly includes a vertically disposed tubular member 150 secured to the frame or body portion 10 by an upper bracket 151 and a lower bracket 152.

Figure 9:
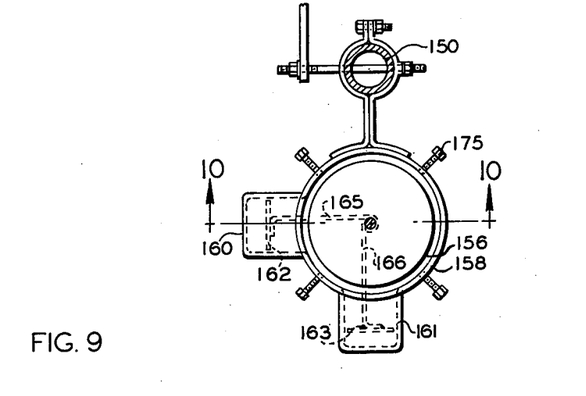
FIG. 9 is a top view of a fluid actuated damping means comprising a portion of the pendulum assembly of FIG. 5, the view being taken along the line 9—9 of FIG. 5.
Figure 10:
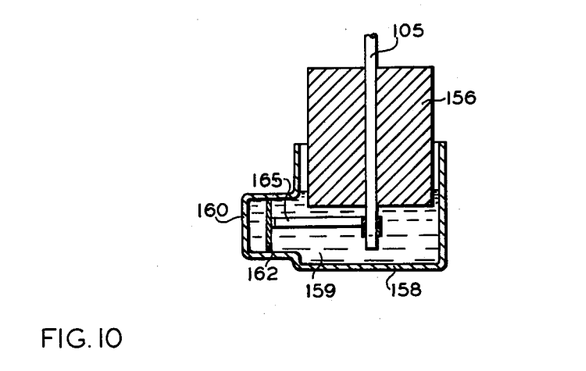
FIG. 10 is a side sectional view of the fluid actuated damping means of FIGS. 5 and 9, the section being taken along the line 10—10 of FIG. 9.

A pendulum member 105 is suspended from an arm 154 at a ball and socket pivot 155 and includes a weight 156, FIGS. 9 and 10, suspended in a container 158 containing hydraulic fluid 159. Container 158 contains a laterally extending cylinder 160 and a longitudinally extending cylinder 161 that carries piston 162 and 163, said pistons being connected to the lower end of pendulum member 105 by rods 165 and 166.

Figure 5:
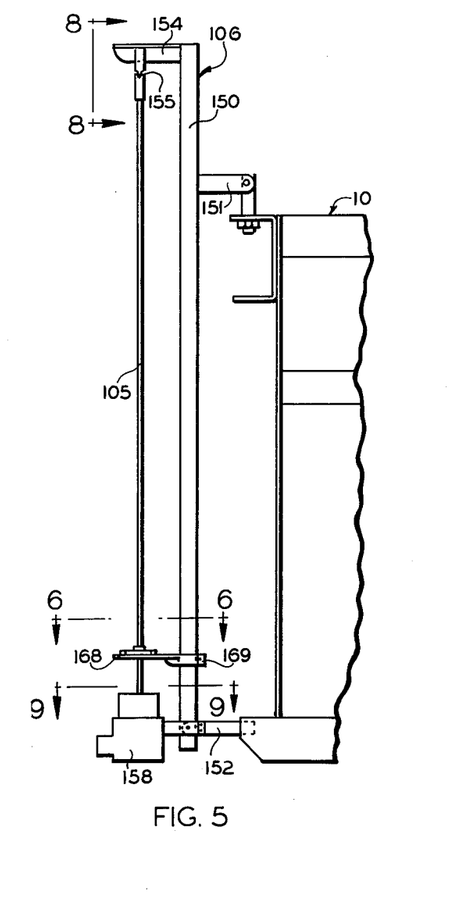
FIG. 5 is a front elevational view of a pendulum assembly comprising a portion of the control means of FIG. 4.
Figure 6:
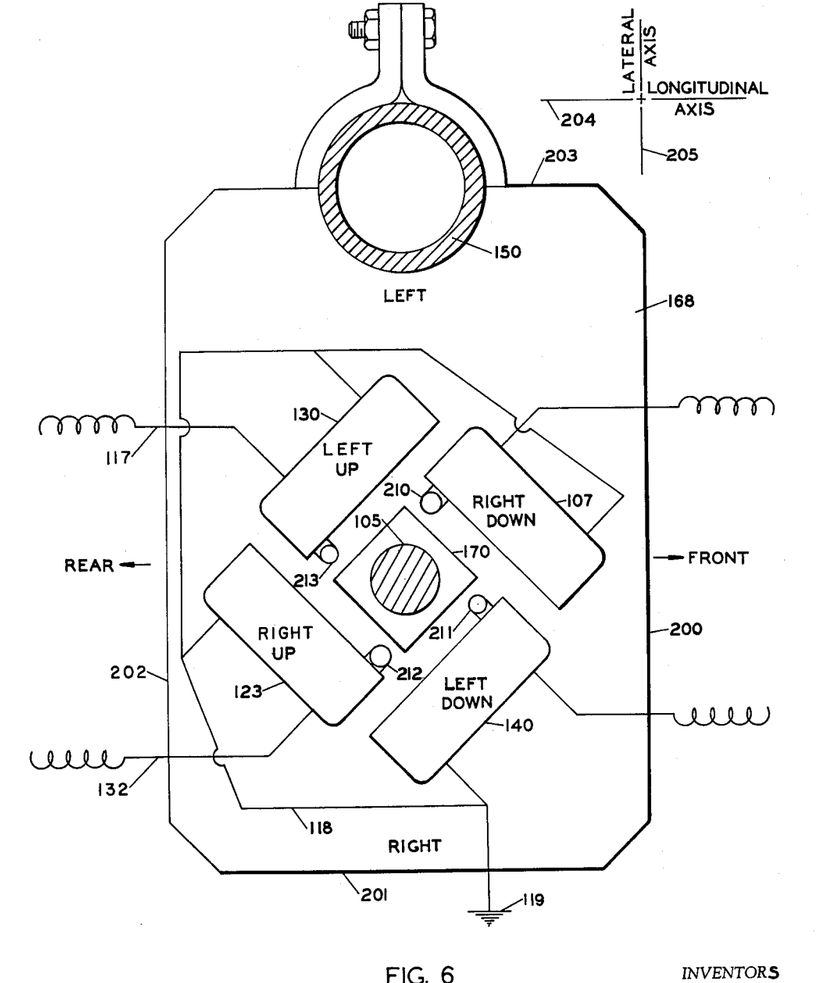
FIG. 6 is a top elevational view of a plurality of switches comprising a portion of the pendulum assembly of FIG. 5, the view being taken along the line 6—6 of FIG. 5.
Figure 7:
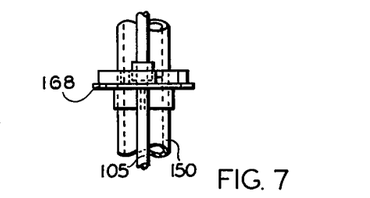
FIG. 7 is an end elevational view of the plurality of switches of FIG. 6.
Figure 8:
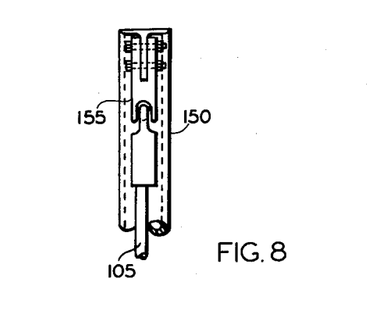
FIG. 8 is a side elevational view showing a pivot comprising a portion of the pendulum assembly of FIG. 5.

With reference to FIGS. 5 through 7, a switch mounting plate 168 is mounted for vertical adjustment along tubular member 150 by means of a frictional clamp 169.

Switch mounting plate 168 carries a right down switch 107, a left down switch 140, a left up switch 130 and a right up switches 123 located on four sides of a switch actuating block 170 mounted on pendulum member 105.

The switches 140, 123, 130, and 107 include actuators 210—213 that are engaged and depressed by a very small movement of pendulum member 105.

It should be pointed out that side 200 of switch mounting plate 168 faces in the direction of the front of the viner and sides 201, 202, and 203 face towards the right, rear, and left of the viner, respectively. Hence it will be understood, from considering FIG. 6, that if the viner is level about a longitudinal axis 204 but is pitched about a lateral axis 205, with the front of the viner low, both the switches 107 and 140 will be actuated by engagement of block 170 by actuators 210 and 211.

If the viner is level about longitudinal axis 204 but is pitched about a lateral axis so that the rear of the viner is low then actuating block 170 is engaged by actuators 212 and 213 which serve to make contact at the switches 123 and 130.

If the viner is level about lateral axis 205 but is in a position of roll about longitudinal axis 204, with the left side low, then actuating block 170 is engaged by actuators 210 and 213 whereby switches 107 and 130 are closed.

This opens left up valve 80 and right down valve 96 whereby fluid is drained from right chambers 133 and 135 and delivered to left chambers 53 and 54. This raises the left and lowers the right side of the viner.

If the viner is in a position of roll to the right and is level about lateral axis 205 then actuators 211 and 212 are caused to engage block 170 whereby switches 123 and 140 are closed.

This opens right up valve 84 and left down valve 82 whereby right chambers 133 and 135 are pressurized and left chambers 53 and 54 are drained to tank whereby the right side is raised and the left side is lowered.

A plurality of adjusting screws 175 extend through the side wall of container 158, FIG. 9, and form stops for limiting the fore, aft, right, and left movement of pendulum member 105.

In operation of pendulum assembly 105, the amount of angular pendulum movement required to actuate a switch can be adjusted by raising and lowering switch mounting plate 168 along vertical rod member 150. In addition, screws 175 can be adjusted to limit the movements of pendulum member 105 just sufficient to depress actuators 210—213 far enough to actuate the small snap acting switches 140, 123, 130, or 107.

Figure 4:
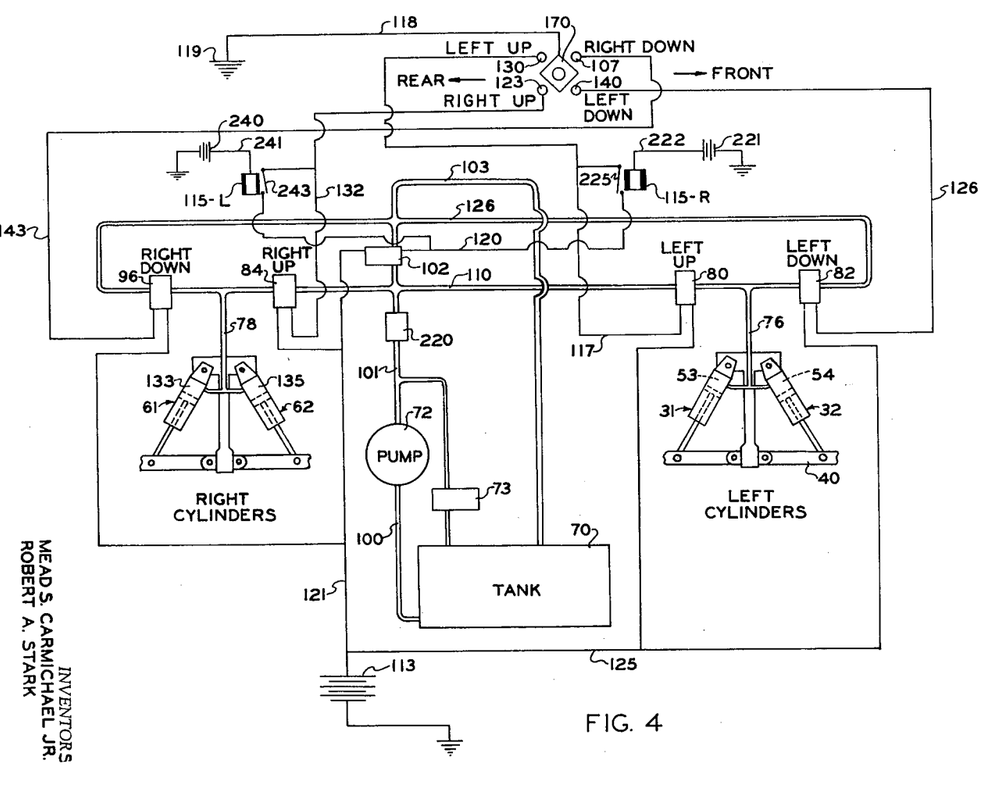
FIG. 4 is a diagrammatic view showing a control means constructed according to the present invention.

Reference is next made to FIG. 4 which diagrammatically illustrates the control system of the present invention. The apparatus includes a reservoir 70 that supplies hydraulic fluid to the intake of a pump 72 via line 100. Pump 72 is continuously driven by a suitable prime mover such as an industrial type gasoline engine mounted on the body of the viner whereby fluid is continuously passed through line 101, a normally open two-positioned solenoid operated valve 102, and line 103 back to reservoir 70.

When the rear of the viner is low the actuators of right up switch 123 and left up switch 130 engage block 170 whereby these two switches are closed. Closing of left up switch 130 energizes the solenoid of left up solenoid valve 80 via battery 113, wire 125, valve 80, wire 117, left up switch 130 and wire 118 to ground 119. This opens valve 80 whereby pressurized fluid is admitted to chambers 53 and 54 of left hand cylinders 31 and 32 via pump 72, line 101, ball check valve 220, line 110, valve 80, and line 76 to chambers 53 and 54.

At the same time solenoid valve 80 is energized and opened by left up switch 123, the field of holding relay 115-R is also energized via battery 221, wire 222, holding relay 115-R, wire 117, switch 130, and wire 118 to ground 119. This closes switch 225 of holding relay 115-R which serves to energize normally open solenoid valve 102 via battery 113, wire 121, the solenoid of valve 102, wire 120, switch 225, wire 117, left up switch 130, and wire 118 to ground 119.

With continued reference to FIG. 4 the closing of right up switch 123 energizes the solenoid of right up solenoid valve 84 and opens said valve via battery 113, wire 121, solenoid of valve 84, wire 132, right up switch 123 and wire 118 to ground 119.

With actuators 210—213 open, pressurized fluid is delivered from pump 72 via line 101, check valve 220, line 110, right up valve 84 and line 78 to chambers 133 and 135 of right cylinders 61 and 62.

It should be pointed out that when the rear of the viner is low, left up switch 130 and right up switch 123 are the only switches closed. Hence normally closed left down solenoid valve 82 and normally closed right down solenoid valve 96 remain closed whereby the pressurized fluid cannot return to tank 70 via lines 126 and 103 but must enter chambers 53, 54, 133 and 135 whereby the rear of the viner is raised to level.

With continued reference to FIG. 4, if the front of the viner is low and the viner is level about its longitudinal axis then the actuators of right down switch 107 and left down switch 140 engage actuating block 170 whereby only these two switches are closed. This serves to energize the solenoid of left down valve 82 whereby the valve is opened and presusrized fluid is released from chambers 53 and 54 of left cylinders 31 and 32 via line 76, valve 82, line 126, and line 103 to tank 70. Similarly pressurized fluid is released from chambers 133 and 135 of right cylinders 61 and 62 via line 78, valve 96, line 126, and line 103 to tank 70.

If the viner is in a position of roll to the right, and is level about its lateral axis, the actuator of left down switch 140 and the actuator of right up switch 123 are caused to engage actuating block 170 whereby switches 123 and 140 are closed. This energizes the solenoid of normally closed left down valve 82 whereby the chambers 53 and 54 of left cylinders 31 and 32 are drained via line 76, valve 82, line 126, and line 103 to tank 70. This causes the left side of the viner to drop until the roll condition is cured at which time switch 140 opens and causes valve 82 to return to its normally closed position. Since right up valve 84 is energized simultaneously with the left down valve 82 the right side of the viner is caused to rise, at the same time the left side is lowered, since chambers 133 and 135 of right cylinders 61 and 62 are placed in communication with pump 72 via line 101, right valve 84 and line 78.

It should be pointed out that normally open solenoid valve 102 is closed at the same time right up valve 84 is energized in order to make pressure available at the right cylinders 61 and 62. This is done by energizing the field of left holding relay 115-L via battery 240, wire 241, field of holding relay 115-L, wire 132, right up switch 123, and wire 118 to ground 119.

Energization of the field of holding relay 115-L closes a switch 243 which energizes the solenoid of normally open valve 102 whereby the valve is closed and prevents pressurized fluid from being returned to tank 70 via line 103. In this instance the solenoid of valve 102 is energized via battery 113, wire 121, the solenoid of valve 102, wire 120, switch 243, wire 132, right up switch 123 and wire 118 to ground 119.

With continued reference to FIG. 4, if the viner is in a position of roll to the left, the actuators of right down switch 107 and left up switch 130 are caused to engage actuating block 170 whereby right switch 107 energizes right down solenoid valve 96 and left up switch 130 energizes left up solenoid valve 80. Right down solenoid valve 96 drains chambers 133 and 135 of right cylinders 61 and 62 via line 78, right down valve 96, line 126, and line 103 to tank 70. At the same time left up solenoid valve 80 places chambers 54 and 54 of left cylinders 31 and 32 in communication with pump 72 via line 101, left up valve 80, and line 76.

When left up valve 80 is open, the drain from the pump back to the tank is cut off by normally open solenoid valve 102 which is energized by holding relay 115-R. The field of this relay is energized via battery 221, wire 222, relay 115-R, wire 117, switch 130, and wire 118 to ground 119.

This closes switch 225 of holding relay 115-R which serves to energize normally open solenoid valve 102 via battery 113, wire 121, the solenoid of valve 102, wire 120, switch 225, wire 117, left up switch 130, and wire 118 to ground 119.

As seen in FIGURE 4 a ball check valve 220 is located in line 101 to prevent fluid from leaking back to tank via lines 110, line 101, pump 72, and line 100 in the event the pump 72 is not in operation. A pressure relief valve 73 which releases pressurized fluid back to tank 70 at a predetermined setting, is provided to protect the fluid system of excessive pressures.

While the form of embodiment of the present invention as herein disclosed constitutes a preferred form, it is to be understood that other forms might be adopted, all coming within the scope of the claims which follow.

We claim:

1. An improved leveling apparatus for a pea viner or the like of the type that includes a body portion supported on a wheeled frame, said apparatus comprising in combination, a right fluid motor connected between said frame and said body portion on the right side thereof; a left fluid motor connected between said frame and body portion on the left side thereof; a pump forming a source of pressurized fluid; means forming a reservoir; means forming a source of electrical energy; a "right up" electrically actuated normally closed valve for controlling the flow of fluid from said pump to said right fluid motor; a "right down" electrically actuated normally closed valve for controlling the flow of fluid from said right fluid motor to said reservoir; a "left up" electrically actuated normally closed valve for controlling the flow of fluid from said pump to said left fluid motor; a "left down" electrically actuated normally closed valve for controlling the flow of fluid from said left fluid motor to the reservoir; conduit means forming a high pressure circuit portion between the outlet of said pump and the inlets of said "right up" and "left up" valves; an electrically actuated normally open valve for draining said high pressure circuit portion back to reservoir; a "right down" switch means for energizing said "right down" valve to release pressurized fluid from said right fluid motor to said reservoir; a "left down" switch means for energizing said "left down" valve to release pressurized fluid from said left fluid motor to said reservoir; a "right up" switch means for energizing said "right up" valve to release pressurized fluid from said source to said right fluid motor; a "left up" switch means for energizing said "left up" valve to release pressurized fluid from said source to said left fluid motor, said switches being in circuit between said source of electrical energy and said electrically actuated valves; sensing means for actuating said switch means responsive to rolling and pitching of said body portion relative to said wheeled frame, only certain of said switch means being actuated at one time; and means for energizing said normally open valve means responsive to operation of certain of said "left up" and "right up" valves.

2. An improved leveling apparatus for a pea viner or the like of the type that includes a body portion supported on a wheeled frame, said apparatus comprising, in combination, a right fluid motor connected between said frame and said body portion on the right side thereof; a left fluid motor connected between said frame and body portion on the left side thereof; a pump forming a source of pressurized fluid; means forming a reservoir; means forming a source of electrical energy; a "right up" electrically actuated normally closed valve for controlling the flow of fluid from said pump to said right fluid motor; a "right down" electrically actuated normally closed valve for controlling the flow of fluid from said right fluid motor to said reservoir; a "left up" electrically actuated normally closed valve for controlling the flow of fluid from said pump to said left fluid motor; a "left down" electrically actuated normally closed valve for controlling the flow of fluid from said left fluid motor to the reservoir; conduit means forming a high pressure circuit portion between the outlet of said pump and the inlets of said "right up" and "left up" valves; an electrically actuated normally open valve for draining said high pressure circuit portion back to reservoir; a pendulum member pivotally suspended on said body portion; a "right down" switch means for energizing said "right down" valve to release pressurized fluid from said right fluid motor to said reservoir; a "left down" switch means for energizing said "left down" valve to release pressurized fluid from said left fluid motor to said reservoir; a "right up" switch means for energizing said "right up" valve to release pressurized fluid from said source to said right fluid motor; a "left up" switch means for energizing said "left up" valve to release pressurized fluid from said source to said left fluid motor; said switches being in circuit between said source of electrical energy and said electrically actuated valves; each of said switch means being provided with an actuator located for engagement by a respective side of said pendulum member, only certain of said actuators being engageable by said pendulum member at one time; and means for energizing said normally open valve means responsive to operation of certain of said "left up" and "right up" valves.

3. An improved leveling apparatus for a pea viner or the like of the type that includes a body portion supported on a wheeled frame, said apparatus comprising, in combination, a right fluid motor connected between said frame and said body portion on the right side thereof; a left fluid motor connected between said frame and body portion on the left side thereof; means forming a source of pressurized fluid; means forming a reservoir; means forming a source of electrical energy; a right electrically actuated valve means for controlling the flow of fluid from said source of fluid to said right fluid motor and from said right fluid motor to said reservoir; a left electrically actuated valve means for controlling the flow of fluid from said source of fluid to said left fluid motor and from said left fluid motor to said reservoir; conduit means forming a high pressure circuit portion between said source of pressurized fluid and said right and left valve means; a pendulum member pivotally suspended on said body portion; a switch mounting bracket mounted to said body portion adjacent said pendulum member; means for vertically adjusting said switch mounting bracket relative to said pendulum member; a "right down" switch means for energizing said right valve means to release pressurized fluid from said right fluid motor to said reservoir; a "left down" switch means for energizing said left valve means to release pressurized fluid from said left fluid motor to said reservoir; a "right up" switch means for energizing said right valve means to release pressurized fluid from said source to said right fluid motor; a "left up" switch means for energizing said left valve means to release pressurized fluid from said source to said left fluid motor; each of said switch means being mounted on said switch mounting bracket and being provided with an actuator located for engagement by a respective side of said pendulum member, only certain of said actuators being engageable by said pendulum member at one time.

4. An improved leveling apparatus for a pea viner or the like of the type that includes a body portion supported on a wheeled frame, said apparatus comprising, in combination, a right fluid motor connected between said frame and said body portion on the right side thereof; a left fluid motor connected between said frame and body portion on the left side thereof; means forming a source of pressurized fluid; means forming a reservoir; means forming a source of electrical energy; a right electrically actuated valve means for controlling the flow of fluid from said source of fluid to said right fluid motor and from said right fluid motor to said reservoir; a left electrically actuated valve means for controlling the flow of fluid from said source of fluid to said left fluid motor and from said left fluid motor to said reservoir; conduit means forming a high pressure circuit portion between said source of pressurized fluid and said right and left valve means; a pendulum member pivotally suspended on said body portion; a "right down" switch means for energizing said right valve means to release pressurized fluid from said right fluid motor to said reservoir; a "left down" switch means for energizing said left valve means to release pressurized fluid from said left fluid motor to said reservoir; a "right up" switch means for energizing said right valve means to release pressurized fluid from said source to said right fluid motor; a "left up" switch means for energizing said left valve means to release pressurized fluid from said source to said left fluid motor, each of said switch means being provided with an actuator located for engagement by a respective side of said pendulum member, only certain of said actuators being engageable by said pendulum member at one time; and fluid actuated retarding means operatively connected to said pendulum member.

5. An improved leveling apparatus for a pea viner or the like of the type that includes a body portion supported on a wheeled frame, said apparatus comprising, in combination, a right fluid motor connected between said frame and said body portion at a first location on the right side thereof; a left fluid motor connected between said frame and body portion at a second location on the left side thereof; means forming a pivotal connection between one end of said frame and body portion at a third location spaced from said first and second locations of said fluid motors, said right and left side of said body portions being simultaneously vertically movable relative to said frame upon simultaneous actuation of said right and left fluid motors, in the same direction, whereby said body portions can be pitched relative to said frame about said pivotal connection; means forming a source of pressurized fluid; means forming a reservoir; means forming a source of electrical energy; a right electrically actuated valve means for controlling the flow of fluid from said source of fluid to said right fluid motor and from said right fluid motor to said reservoir; a left electrically actuated valve means for controlling the flow of fluid from said source of fluid to said left fluid motor and from said left fluid motor to said reservoir; a pendulum member pivotally suspended on said body portion; conduit means forming a high pressure circuit portion between said source of pressurized fluid and said right and left valve means; a "right down" switch means for energizing said right valve means to release pressurized fluid from said right fluid motor to said reservoir; a "left down" switch means for energizing said left valve means to release pressurized fluid from said left fluid motor to said reservoir; a "right up" switch means for energizing said right valve means to release pressurized fluid from said source to said right fluid motor; a "left up" switch means for energizing said left valve means to release pressurized fluid from said source to said left fluid motor, said switch means being in circuit with said source of electrical energy and said valve means for selectively energizing said valve means to admit and release fluid to and from said fluid motors to maintain said body portion in level disposition and means for actuating said switch means by said pendulum means, only certain of said switch means being actuated at one time.

6. An improved leveling apparatus for a pea viner or the like of the type that includes a body portion supported on a wheeled frame, said apparatus comprising, in combination, a right fluid motor connected between said frame and said body portion at a first location on the right side of one end thereof; a left fluid motor connected between said frame and body portion at a second location on the left side of said one end thereof; means forming a pivotal connection between the other end of said frame and body portion at a third location spaced from said first and second locations of said fluid motors, said right and left side of said body portions being simultaneously vertically movable relative to said frame upon simultaneous actuation of said right and left fluid motors, in the same direction, whereby said body portions can be pitched relative to said frame about said pivotal connection; means forming a source of pressurized fluid; means forming a reservoir; means forming a source of electrical energy; a right electrically actuated valve means for controlling the flow of fluid to and from said right fluid motor; a left electrically actuated valve means for controlling the flow of fluid to and from said left fluid motor; conduit means forming a high pressure circuit portion between said source of pressurized fluid and said right and left valve means; a pendulum member pivotally suspended on said body portion; a "right down" switch means actuated by lowering of said other end or by lowering of said left side for energizing said right valve means to release pressurized fluid from said right fluid motor to said reservoir; a "left down" switch means actuated by lowering of said other end or by lowering of said right side for energizing said left valve means to release pressurized fluid from said left fluid motor to said reservoir; a "right up" switch means actuated by lowering of said one end or by lowering of said right side for energizing said right valve means to release pressurized fluid from said source to said right fluid motor; a "left up" switch means actuated by lowering of said one end or by lowering of said left side for energizing said left valve means to release pressurized fluid from said source to said left fluid motor, said switch means being in circuit with said source of electrical energy and said valve means for selectively energizing said valve means to admit and release fluid to and from said fluid motors to maintain said body portion in level disposition and means for actuating said switch means by said pendulum means, only certain of said switch means being actuated at one time.

7. An improved leveling apparatus for a pea viner or the like of the type that includes a body portion supported on a wheeled frame, said apparatus comprising, in combination, a right fluid motor connected between said frame and said body portion at a first location on the right side of the rear end thereof; a left fluid motor connected between said frame and body portion at a second location on the left side of the rear thereof; means forming a pivotal connection between the front end of said frame and body portion at a third location spaced from said first and second locations of said fluid motors, said right and left side of said body portions being simultaneously vertically movable relative to said frame upon simultaneous actuation of said right and left fluid motors, in the same direction, whereby said body portions can be pitched relative to said frame about said pivotal connection; means forming a source of pressurized fluid; means forming a reservoir; means forming a source of electrical energy; a right electrically actuated valve means for controlling the flow of fluid to and from said right fluid motor; a left electrically actuated valve means for controlling the flow of fluid to and from said left fluid motor; conduit means forming a high pressure circuit portion between said source of pressurized fluid and said right and left valve means; a pendulum member pivotally suspended on said body portion; a "right down" switch means actuated by lowering of said front end or by lowering of said left side for energizing said right valve means to release pressurized fluid from said right fluid motor to said reservoir; a "left down" switch means actuated by lowering of said front end or by lowering of said right side for energizing said left valve means to release pressurized fluid from said left fluid motor to said reservoir; a "right up" switch means actuated by lowering of said rear end or by lowering of said right side for energizing said right valve means to release pressurized fluid from said source to said right fluid motor; a "left up" switch means actuated by lowering of said rear end or by lowering of said left side for energizing said left valve means to release pressurized fluid from said source to said left fluid motor, said switch means being in circuit with said source of electrical energy and said valve means for selectively energizing said valve means to admit and release fluid to and from said fluid motors to maintain said body portion in level disposition and means for actuating said switch means by said pendulum means, only certain of said switch means being actuated at one time.

8. An improved leveling apparatus for a pea viner or the like of the type that includes a body portion supported on a wheel frame, said apparatus comprising, in combination, a right fluid motor connected between said frame and said body portion at a first location on the right side of the rear end thereof; a left fluid motor connected between said frame and body portion at a second location on the left side of the rear thereof; means forming a pivotal connection between the front end of said frame and body portion at a third location spaced from said first and second locations of said fluid motors, said right and left side of said body portions being simultaneously vertically movable relative to said frame upon simultaneous actuation of said right and left fluid motors, in the same direction, whereby said body portions can be pitched relative to said frame about said pivotal connection; means forming a source of pressurized fluid; means forming a reservoir; means forming a source of electrical energy; a right electrically actuated valve means for controlling the flow of fluid to and from said right fluid motor; a left electrically actuated valve means for controlling the flow of fluid to and from said left fluid motor; conduit means forming a high pressure circuit portion between said source of pressurized fluid and said right and left valve means; a pendulum member pivotally suspended on said body portion; a switch mounting bracket mounted to said body portion in surrounding relationship with said pendulum member; a "right down" switch means on said bracket and including an actuator located adjacent a front left side of said pendulum member; a "left down" switch means on said bracket means and including an actuator located adjacent a front right side of said pendulum member; a "left up" switch means on said bracket means and including an actuator located adjacent a rear left side of said pendulum member; a "right up" switch means on said bracket means and including an actuator located adjacent a rear right side of said pendulum member, only certain of said actuators being engageable with said pendulum member at one time, said switch means being in circuit with said source of electrical energy and said valve means for selectively energizing said valve means to admit and release fluid to and from said fluid motors to maintain said body portion in level disposition.

9. An improved leveling apparatus for a pea viner or the like of the type that includes a body portion supported on a wheeled frame, said apparatus comprising, in combination, a right fluid motor connected between said frame and said body portion on the right side of the rear end thereof; a left fluid motor connected between said frame and body portion on the left side of the rear thereof; means forming a pivotal connection between the front end of said frame and body portion at a location spaced from said fluid motors; means forming a source of pressurized fluid; means forming a reservoir; means forming a source of electrical energy; a right electrically actuated valve means for controlling the flow of fluid to and from said right fluid motor; a left electrically actuated valve means for controlling the flow of fluid to and from said left fluid motor; conduit means forming a high pressure circuit portion between said source of pressurized fluid and said right and left valve means; a pendulum member pivotally suspended on said body portion and including a switch operator, said pendulum member being shiftable fore and aft and right and left of a centered position; a switch mounting bracket mounted to said body portion in surrounding relationship with said switch operator; a "right down" switch means on said bracket and including an actuator located adjacent a front left side of said switch operator whereby either pitching or rolling of said body portion causes said operator to engage said actuator; a "left down" switch means on said bracket means and including an actuator located adjacent a front right side of said switch operator whereby either pitching or rolling of said body portion causes said operator to engage said actuator; a "left up" switch means on said bracket means and including an actuator located adjacent a rear left side of said switch operator whereby either pitching or rolling of said body portion causes said operator to engage said actuator; a "right up" switch means on said bracket means and including an actuator located adjacent a rear right side of said switch operator whereby either pitching or rolling of said body portion causes said operator to engage said actuator, only certain of said actuators being engageable with said pendulum member at one time, said switch means being in circuit with said source of electrical energy and said valve means for selectively energizing said valve means to admit and release fluid to and from said fluid motors to maintain body portion in level disposition.

10. The apparatus defined in claim 5 includes a fluid actuated retarding means for said pendulum member.

11. An improved leveling apparatus for a pea viner or the like of the type that includes a body portion supported on a wheeled frame, said apparatus comprising, in combination, a right fluid motor connected between said frame and said body portion on the right side thereof; a left fluid motor connected between said frame and body portion on the left side thereof; means forming a pivotal connection between one end of said frame and body portion at a location spaced from said fluid motors, means forming a source of pressurized fluid; means forming a reservoir; means forming a source of electrical energy; a right electrically actuated valve means for controlling the flow of fluid from said source of fluid to said right fluid motor and from said right fluid motor to said reservoir; a left electrically actuated valve means for controlling the flow of fluid from said source of fluid to said left fluid motor and from said left fluid motor to said reservoir; conduit means forming a high pressure circuit portion between said source of pressurized fluid and said right and left valve means; a pendulum member pivotally suspended on said body portion; a "right down" switch means for energizing said right valve means to release pressurized fluid from said right fluid motor to said reservoir; a "left down" switch means for energizing said left valve means to release pressurized fluid from said left fluid motor to said reservoir; a "right up" switch means for energizing said right valve means to release pressurized fluid from said source to said right fluid motor; a "left up" switch means for energizing said left valve means to release pressurized fluid from said source to said left fluid motor, said switch means being in circuit with said source of electrical energy and said valve means for selectively energizing said valve means to admit and release fluid to and from said fluid motors to maintain said body portion in level disposition, said pendulum member including a fluid actuated retarding means provided with a first piston and cylinder extending longitudinally relative to said body portion and a second piston and cylinder extending laterally relative to said body portion, said pistons and cylinders being operatively connected to said pendulum member; and means for actuating said switch means by said pendulum means, only certain of said switch means being actuated at one time.

12. An improved leveling apparatus for a pea viner or the like of the type that includes a body portion supported on a wheeled frame, said apparatus comprising, in combination, a right fluid motor connected between said frame and said body portion on the right side thereof; a left fluid motor connected between said frame and body portion on the left side thereof; means forming a source of pressurized fluid; means forming a reservoir; means forming a source of electrical energy; a right electrically actuated valve means for controlling the flow of fluid from said source of fluid to said right fluid motor and from said right fluid motor to said reservoir; a left electrically actuated valve means for controlling the flow of fluid from said source of fluid to said left fluid motor and from said left fluid motor to said reservoir; conduit means forming a high pressure circuit portion between said source of pressurized fluid and said right and left valve means; a pendulum member pivotally suspended on said body portion; a "right down" switch means for energizing said right valve means to release pressurized fluid from said right fluid motor to said reservoir; a "left down" switch means for energizing said left valve means to release pressurized fluid from said left fluid motor to said reservoir; a "right up" switch means for energizing said right valve means to release pressurized fluid from said source to said right fluid motor; a "left up" switch means for energizing said left valve means to release pressurized fluid from said source to said left fluid motor, each of said switch means being provided with an actuator located for engagement by a respective side of said pendulum member, only certain of said actuators being engageable by said pendulum member at one time; and fluid actuated retarding means including a first piston and cylinder extending longitudinally relative to said body portion and a second piston and cylinder extending laterally relative to said body portion, said pistons and cylinders being operatively connected to the lower end of said pendulum member.

References Cited in the file of this patent

UNITED STATES PATENTS

| | | |
|---|---|---|
| 2,076,523 | Ballack | Apr. 13, 1937 |
| 2,287,068 | Shonnard | June 23, 1942 |
| 2,405,289 | Waterman | Apr. 18, 1950 |
| 2,684,254 | Goss | July 20, 1954 |
| 2,756,062 | Thixton | July 24, 1956 |
| 2,796,717 | Orelind | June 25, 1957 |
| 2,801,511 | Vogelaar | Aug. 6, 1957 |